(12) United States Patent
Fujii et al.

(10) Patent No.: US 12,296,414 B2
(45) Date of Patent: May 13, 2025

(54) ADDITIVE MANUFACTURING METHOD, ADDITIVE MANUFACTURING DEVICE, AND CONTROLLER

(71) Applicant: KOBE STEEL, LTD., Hyogo (JP)

(72) Inventors: Tatsuya Fujii, Hyogo (JP); Masatoshi Hida, Hyogo (JP); Shuo Huang, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 784 days.

(21) Appl. No.: 17/622,612

(22) PCT Filed: Jun. 22, 2020

(86) PCT No.: PCT/JP2020/024378
§ 371 (c)(1),
(2) Date: Dec. 23, 2021

(87) PCT Pub. No.: WO2020/262291
PCT Pub. Date: Dec. 30, 2020

(65) Prior Publication Data
US 2022/0355407 A1    Nov. 10, 2022

(30) Foreign Application Priority Data

Jun. 26, 2019   (JP) ................................ 2019-118745

(51) Int. Cl.
*B23K 9/04* (2006.01)
*B23K 9/095* (2006.01)
(Continued)

(52) U.S. Cl.
CPC ............ *B23K 9/042* (2013.01); *B23K 9/0953* (2013.01); *B23K 9/12* (2013.01); *B33Y 10/00* (2014.12); *B33Y 50/02* (2014.12)

(58) Field of Classification Search
CPC .................. B23K 35/02; B23K 9/0216; G05B 2219/49007; G05B 2219/49004;
(Continued)

(56) References Cited

U.S. PATENT DOCUMENTS

2019/0025798 A1    1/2019   Yamasaki

FOREIGN PATENT DOCUMENTS

CN         109145524 A      1/2019
EP         3 417 973 A1    12/2018
(Continued)

OTHER PUBLICATIONS

STIC Search report (Year: 2024).*
(Continued)

*Primary Examiner* — Vy T Nguyen
(74) *Attorney, Agent, or Firm* — Studebaker Brackett PLLC (57) ABSTRACT

In preparing a built-up object by depositing beads, in a step of dividing into the bead model, a trapezoidal bead model a cross section of which is a trapezoidal shape is applied to a position where the bead is formed in a portion not adjacent to an existing bead, and a parallelogram bead model a cross section of which is a parallelogram is applied to a position where the bead is formed adjacent to a bead that is already formed, in the parallelogram bead model opposite sides in the deposition direction of the bead being parallel to each other, and opposite sides in the bead arrangement direction being parallel to a side of another bead mode that is adjacent.

13 Claims, 8 Drawing Sheets

(51) Int. Cl.
*B23K 9/12* (2006.01)
*B33Y 10/00* (2015.01)
*B33Y 50/02* (2015.01)

(58) Field of Classification Search
CPC ........... G05B 2219/49008; G05B 2219/49011;
G05B 2219/49016; G05B 2219/49023;
G05B 2219/49026; G05B 2219/49029;
G05B 2219/49066; G05B 2219/50045;
G05B 2219/40564
USPC .................................. 219/76; 700/118, 119
See application file for complete search history.

(56) References Cited

FOREIGN PATENT DOCUMENTS

| | | | |
|---|---|---|---|
| JP | 2010-201474 A | | 9/2010 |
| JP | 2018-027558 A | | 2/2018 |
| JP | 6802773 B2 | * | 12/2020 |
| WO | 2017/141639 A1 | | 8/2017 |

OTHER PUBLICATIONS

Zhou, CN 104408214 (Year: 2015).*
The extended European search report issued by the European Patent Office on Jul. 8, 2022, which corresponds to European Patent Application No. 20833390.6-1103 and is related to U.S. Appl. No. 17/622,612.
International Search Report issued in PCT/JP2020/024378; mailed Sep. 8, 2020.
Written Opinion issued in PCT/JP2020/024378; mailed on Sep. 8, 2020.

* cited by examiner

ADDITIVE MANUFACTURING METHOD, ADDITIVE MANUFACTURING DEVICE, AND CONTROLLER

TECHNICAL FIELD

The present invention relates to an additive manufacturing method, an additive manufacturing apparatus, and a controller for preparing a built-up object by depositing a bead.

BACKGROUND ART

A technique is known in which a bead formed by a welding technique such as arc welding is deposited to produce a welded structure or an additively-manufactured object (for example, Patent Literatures 1 and 2).

Patent Literature 1 describes a technique for appropriately setting a condition of a welding pass by subjecting a welding cross-sectional shape to an analysis model to perform elasto-plastic analysis or the like at the time of performing groove-welding. In addition, Patent Literature 2 describes a technique in which a bead to be deposited is represented by an elliptic model, and a trajectory plan for bead formation of additive manufacturing is performed. In this trajectory plan, a database of a relationship between a specific parameter representing the elliptic model and a building condition is created in advance, and the building condition of the target shape is determined by a simulation based on the database.

CITATION LIST

Patent Literature

Patent Literature 1: JP-A-2010-201474
Patent Literature 2: JP-A-2018-27558

SUMMARY OF INVENTION

Technical Problem

However, when the bead shape is approximated by a circle or an ellipse in the setting of the welding pass and the trajectory plan of additive manufacturing as described above, for example, the geometric calculation such as the extraction of the position of the intersection point between the curved surfaces is complicated. Further, in order to express the joint cross section calculated from the welding conditions, it is necessary to set an appropriate curvature or the like, and the trajectory plan of the bead formation is complicated.

Accordingly, an object of the present invention is to provide an additive manufacturing method, an additive manufacturing apparatus, and a controller by which a trajectory plan for bead formation of an additively-manufactured object can be created without requiring a complicated arithmetic operation and an additively-manufactured object can be obtained easily and accurately.

Solution to Problem

The present invention has the following configuration.
(1) An additive manufacturing method for preparing a built-up object by depositing a bead formed by melting and solidifying a filler metal on a base, the method including:
a step of reading three-dimensional shape data of the built-up object;
a step of determining a deposition direction of the bead depending on a three-dimensional model shape of the three-dimensional shape data;
a step of dividing the three-dimensional model shape into a plurality of layers along the deposition direction;
a step of dividing each layer, that is divided, into a bead model of a plurality of lines depending on a bead shape in a formation order of the bead; and
a step of preparing the built-up object by repeating a process of forming the bead along the bead model from a lower layer to an upper layer of the plurality of layers, wherein,
in the step of dividing into the bead model of the plurality of lines,
to a position where the bead is formed in a portion not adjacent to an existing bead in the layer, a trapezoidal bead model a vertical cross section of which in a bead longitudinal direction is a trapezoidal shape is applied, in the trapezoidal bead model opposite sides in the deposition direction of the bead being parallel to each other, and opposite sides in a bead arrangement direction in the layer being non-parallel to each other, and,
to a position where the bead is formed adjacent to a bead that is already formed, a parallelogram bead model a vertical cross section of which in the bead longitudinal direction is a parallelogram is applied, in the parallelogram bead model opposite sides in the deposition direction of the bead being parallel to each other, and opposite sides in the bead arrangement direction being parallel to a side of another bead mode that is adjacent.
(2) A manufacturing apparatus for manufacturing an additively-manufactured object, to prepare a built-up object by depositing a bead formed by melting and solidifying a filler metal on a base by a torch, the manufacturing apparatus including:
a controller configured to read three-dimensional shape data of the built-up object, determine a deposition direction of the bead depending on a three-dimensional model shape of the three-dimensional shape data, divide the three-dimensional model shape into a plurality of layers along the deposition direction, divide each layer, that is divided, into a bead model of a plurality of lines depending on a bead shape in a formation order of the bead, and determine a trajectory plan of the torch; and
an additive manufacturing apparatus configured to prepare the built-up object by repeating a process of forming the bead along the bead model from a lower layer to an upper layer of the plurality of layers, wherein,
in a case of dividing into the bead model of the plurality of lines, the controller
applies, to a position where the bead is formed in a portion not adjacent to an existing bead in the layer, a trapezoidal bead model a vertical cross section of which in a bead longitudinal direction is a trapezoidal shape, in the trapezoidal bead model opposite sides in the deposition direction of the bead being parallel to each other, and opposite sides in a bead arrangement direction in the layer being non-parallel to each other, and
applies, to a position where the bead is formed adjacent to a bead that is already formed, a parallelogram bead model a vertical cross section of which in the bead longitudinal direction is a parallelogram, in the parallelogram bead model opposite sides in the deposition direction of the bead being parallel to each other, and opposite sides in the bead arrangement direction being parallel to a side of another bead mode that is adjacent.

(3) A controller configured to read three-dimensional shape data of a built-up object formed by depositing a bead formed by melting and solidifying a filler metal on a base by a torch, determine a deposition direction of the bead depending on a three-dimensional model shape of the three-dimensional shape data, divide the three-dimensional model shape into a plurality of layers along the deposition direction, divide the divided layers into a bead model of a plurality of lines depending on the bead shape in the formation order of the bead, and determine a trajectory plan of the torch, wherein in a case of dividing into the bead model of the plurality of lines, the controller applies, to a position where the bead is formed in a portion not adjacent to an existing bead in the layer, a trapezoidal bead model a vertical cross section of which in a bead longitudinal direction is a trapezoidal shape, in the trapezoidal bead model opposite sides in the deposition direction of the bead being parallel to each other, and opposite sides in a bead arrangement direction in the layer being non-parallel to each other, and applies, to a position where the bead is formed adjacent to a bead that is already formed, a parallelogram bead model a vertical cross section of which in the bead longitudinal direction is a parallelogram, in the parallelogram bead model opposite sides in the deposition direction of the bead being parallel to each other, and opposite sides in the bead arrangement direction being parallel to a side of another bead mode that is adjacent.

Advantageous Effects of Invention

According to the present invention, a trajectory plan for bead formation of an additively-manufactured object can be created without requiring a complicated arithmetic operation, and an additively-manufactured object can be obtained easily and with high accuracy.

DESCRIPTION OF EMBODIMENTS

Hereinafter, embodiments of the present invention will be described in detail with reference to the drawings.

<Apparatus for Manufacturing Additively-Manufactured Object>

Figure 1:
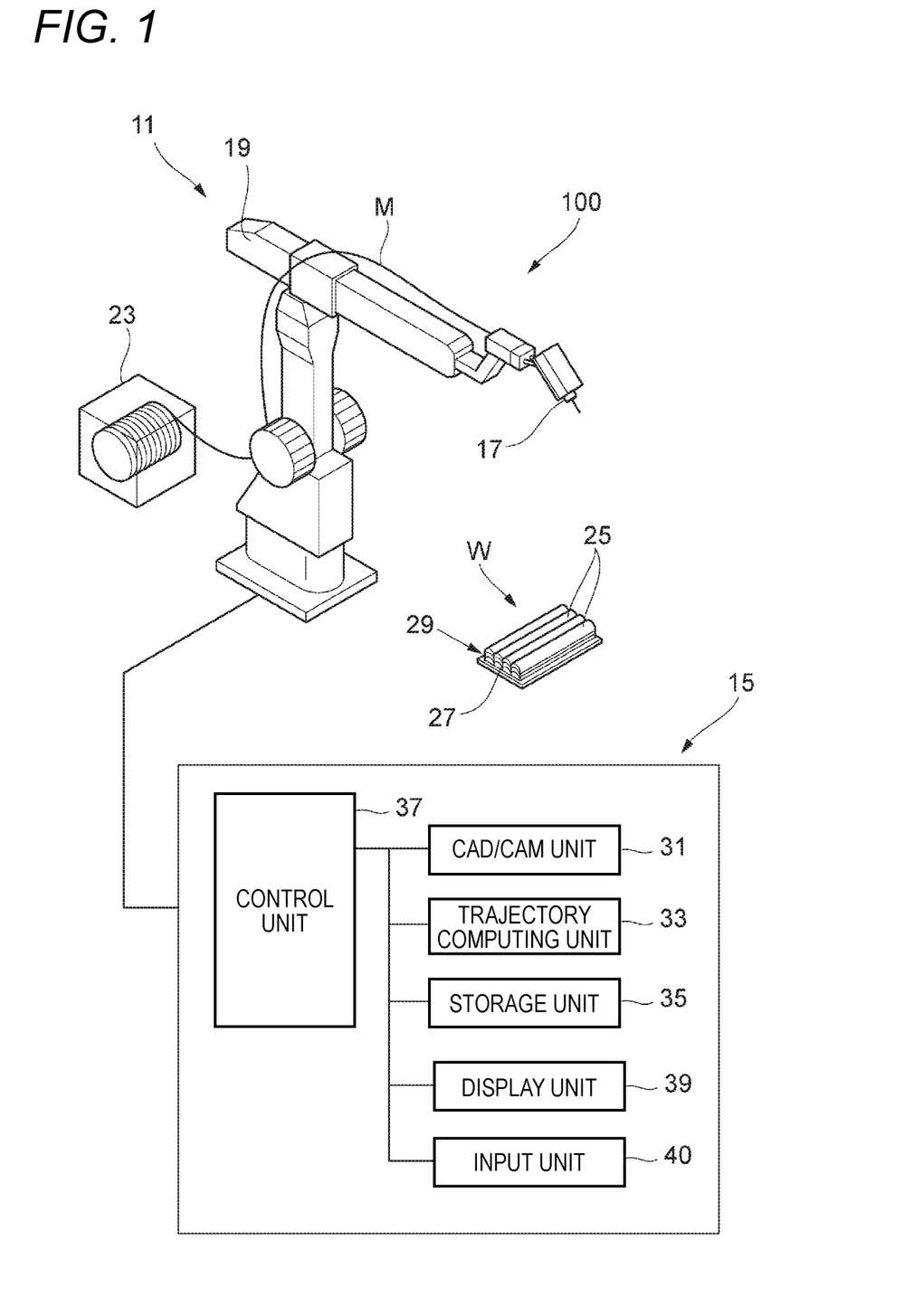
FIG. 1 is a schematic configuration diagram illustrating an example of an apparatus for manufacturing an additively-manufactured object for carrying out an additive manufacturing method.

FIG. 1 is a schematic configuration diagram illustrating an example of an apparatus for manufacturing an additively-manufactured object for carrying out an additive manufacturing method according to the present invention.

A manufacturing apparatus 100 of an additively-manufactured object of the present configuration is a device that forms an additively-manufactured object or an additively-manufactured object as a blank for obtaining an additively-manufactured object of a desired shape, and includes an additive manufacturing apparatus 11 and a controller 15 that collectively controls the additive manufacturing apparatus 11.

The additive manufacturing apparatus 11 includes a welding robot 19 having a torch 17 provided on a tip shaft, and a filler metal feeding unit 23 for feeding a filler metal (weld wire) M to the torch 17. The torch 17 holds the filler metal M in a state of protruding from the tip.

The welding robot 19 is an articulated robot, and in the torch 17, the filler metal M is supported such that the filler metal can be continuously fed. The position or posture of the torch 17 can be set three-dimensionally desirably within the range of the degree of freedom of the robot arm.

The torch 17 includes a not-shown shield nozzle, and a shielding gas is supplied from the shield nozzle. The arc welding method may be either a consumable electrode type such as shielded metal arc welding or carbon dioxide gas arc welding, or a non-consumable electrode type such as TIG welding or plasma arc welding, and the arc welding method is appropriately selected depending on the additively-manufactured object to be manufactured.

For example, in the case of the consumable electrode type, a contact tip is disposed inside the shield nozzle, and the filler metal M to which a melting current is to be supplied is held on the contact tip. The torch 17 generates an arc from the tip of the filler metal M in a shielding gas atmosphere while holding the filler metal M. The filler metal M is fed from the filler metal feeding unit 23 to the torch 17 by a not-shown delivery mechanism attached to the robot arm, etc. Then, when the filler metal M fed continuously is melted and solidified while the torch 17 is moved, a linear bead 25 which is a melt-solidified body of the filler metal M is formed on a base plate 27.

The heat source for melting the filler metal M is not limited to the aforementioned arc. A heat source using another system such as a heating system using an arc and a laser together, a heating system using a plasma or a heating system using an electron beam or a laser may be used. In the case of heating by an electron beam or a laser, a heating amount can be controlled more finely to keep each weld bead in a more proper state, thereby contributing to further improvement of the quality of the additively-manufactured object.

Any commercially available weld wire can be used as the filler metal M. For example, wires provided as MAG welding and MIG welding solid wires (JIS Z 3312) for mild steel, high tensile steel and cryogenic steel, and arc welding flux cored wires (JIS Z 3313) for mild steel, high tensile steel and cryogenic steel can be used as the filler metal M.

The controller 15 includes a CAD/CAM unit 31, a trajectory computing unit 33, a storage unit 35, and a control unit 37 to which these units are connected. The controller 15 is configured by a computer unit having a CPU, a memory, a storage, and the like. The controller 15 further includes a display unit 39 such as a liquid crystal display on which information indicating the shape of the additive manufactured object, information of a trajectory plan indicating a movement trajectory of the torch 17 during additive manufacturing, welding conditions, and the like are displayed, and an input unit 40 such as a keyboard and a mouse for receiving various kinds of input information.

The CAD/CAM unit 31 reads three-dimensional shape data (CAD data or the like) of the additive manufactured object to be manufactured, divides the three-dimensional model depending on the three-dimensional shape data into a plurality of layers, and generates layer shape data indicating the shape of each layer. The trajectory computing unit 33 divides the generated layer shape data into a bead model of the plurality of lines to be described later, and determines a movement trajectory of the torch 17. The storage unit 35 stores various types of data including information such as the generated layer shape data and the movement trajectory of the torch 17, and a drive program.

The control unit 37 executes a drive program created depending on the layer shape data stored in the storage unit 35 and the movement trajectory of the torch 17 to drive the welding robot 19. That is, the welding robot 19 moves the torch 17 along the track trajectory created by the trajectory computing unit 33 in response to a command from the controller 15.

Figure 2:
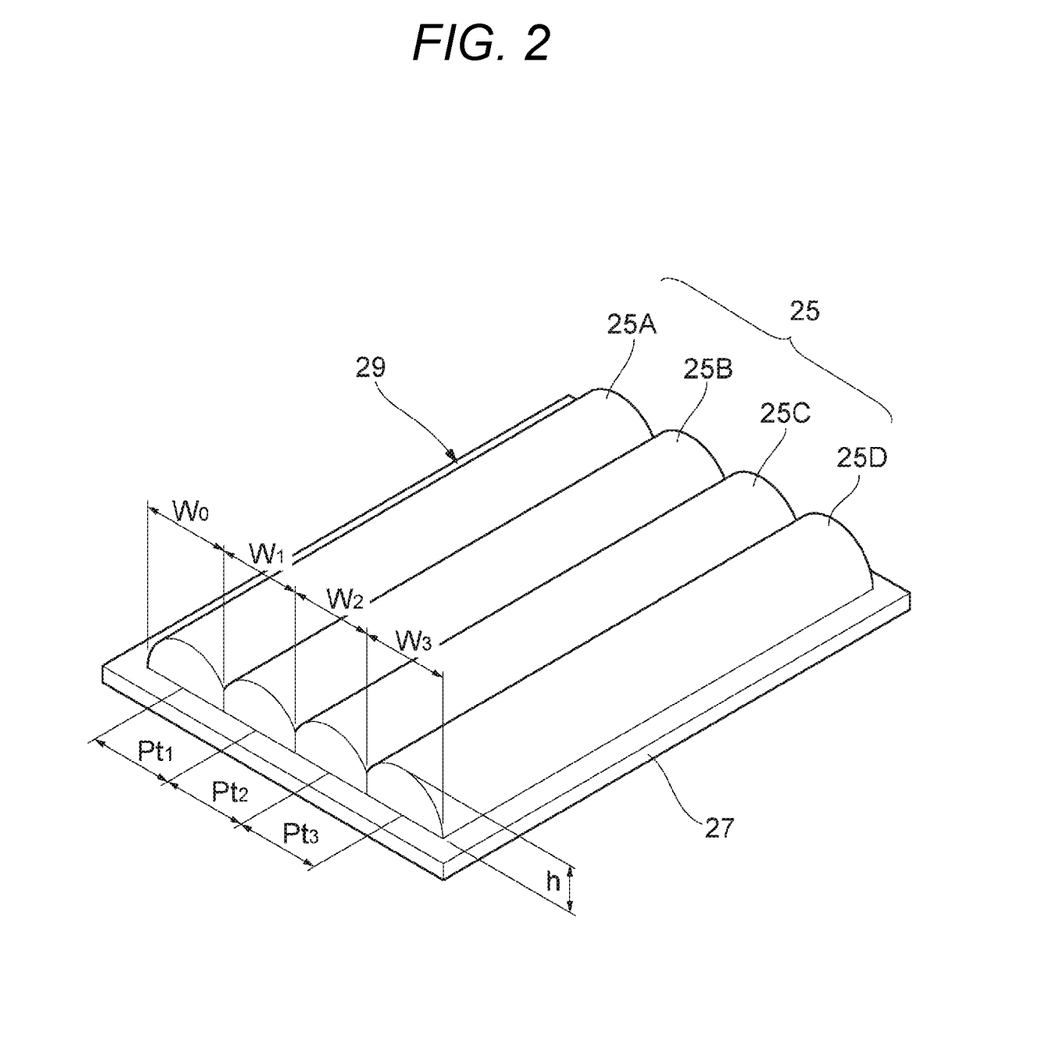
FIG. 2 is a perspective view illustrating a plurality of linear beads formed on a base plate.

The manufacturing apparatus 100 of the additively-manufactured object having the above configuration moves the torch 17 by the driving of the welding robot 19 along the movement trajectory of the torch 17 generated from the layer shape data. Along with the movement of the torch 17, the filler metal M is melted, and the melted filler metal M is fed onto the base plate 27. As a result, as illustrated in FIG. 2, a bead layer 29 in which the plurality of linear beads 25A, 25B, 25C, and 25D are solidified and arranged on the base plate 27 is formed. FIG. 2 illustrates the bead layer 29 of the initial layer, but similar bead layers are deposited a plurality of times on the bead layer 29, an additively-manufactured object W having a multilayer structure as illustrated in FIG. 1 is formed.

The base plate 27 is made of a metal plate such as a steel plate, but is not limited to such a plate shape one, and may be a base having another shape such as a block or a rod shape.

<First Additive Manufacturing Method>

The additively-manufactured object W described above is formed based on a deposition plan indicating a procedure of depositing and forming a plurality of beads 25. Specifically, the controller 15 illustrated in FIG. 1 generates a drive program based on the deposition plan, and the control unit 37 executes the generated drive program. The control unit 37 drives each unit such as the torch 17 of the additive manufacturing apparatus 11 according to the drive program to form a bead. As a result, the additively-manufactured object W having a desired shape is formed. The drive program may be generated by another computer device by inputting required information to another computer device different from the controller 15. In this case, the generated drive program is input to the storage unit 35 of the controller 15 via an appropriate communication unit such as a LAN.

The above-described deposition plan includes a process of converting the shape of the additively-manufactured object W into an aggregate of a model (bead model) representing a bead shape. When the bead is formed by moving the torch 17 along the bead model, the bead model has information such as position information (information of a torch movement trajectory) at which the additively-manufactured object W is finally obtained, and information on the size, length, cross-sectional shape, and the like of each bead.

When determining the deposition plan, it is preferable that the controller 15 or the other computer device functioning as the controller 15 displays, on the display unit 39, information on the trajectory plan such as a three-dimensional model depending on the three-dimensional shape data of the additively-manufactured object W, a deposition direction of the bead, a divided layer, a bead model of a plurality of lines, and the like. By displaying the deposition plan in a visually easy-to-understand manner on the display unit 9, it is possible to efficiently support the operation of determining the deposition plan of the operator.

Figure 3:
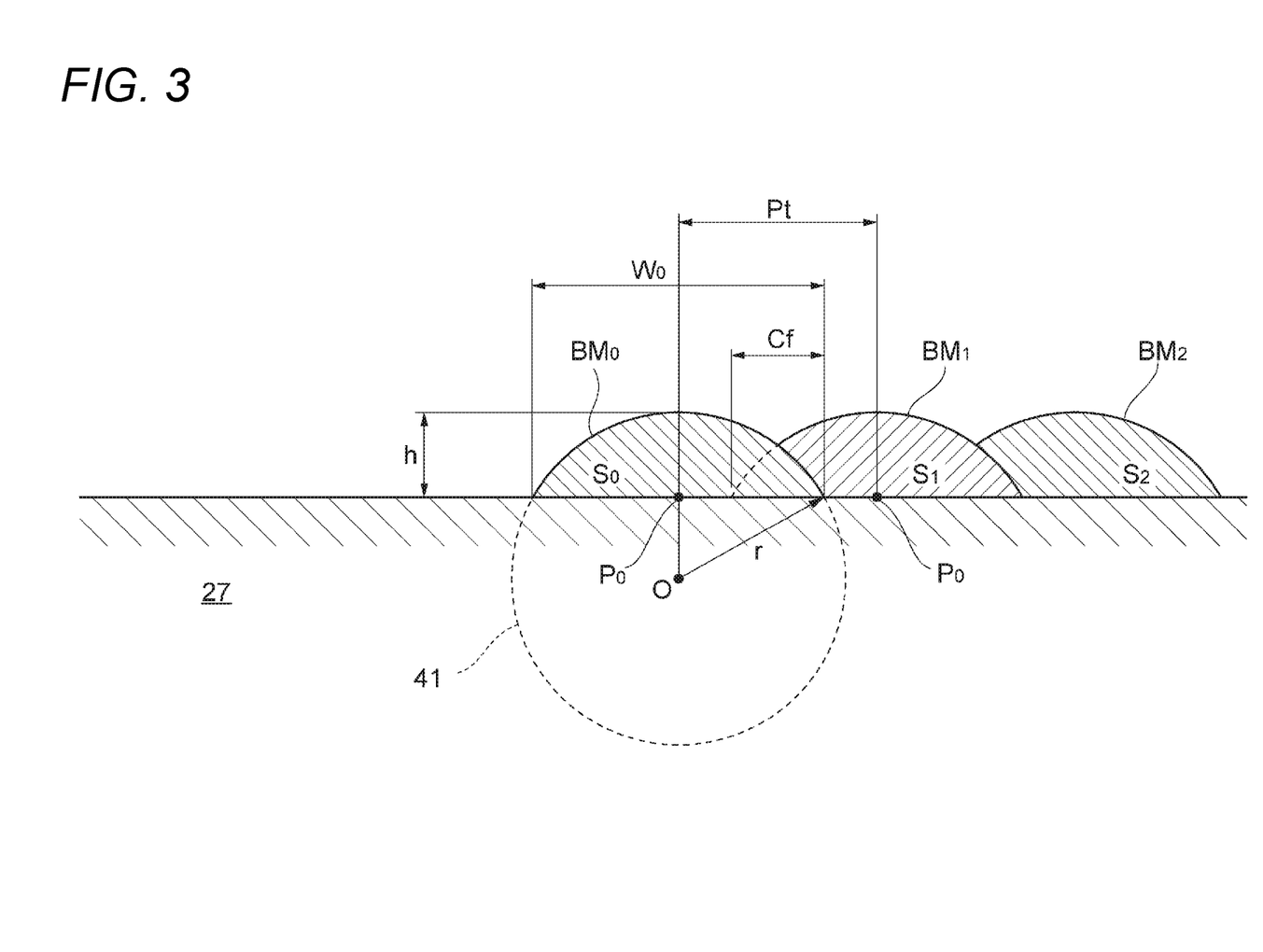
FIG. 3 is a cross-sectional view illustrating a conventional bead model illustrated as a reference example.

FIG. 3 is a cross-sectional view illustrating a conventional bead model as a reference example.

As a conventional bead model for forming the additively-manufactured object, a shape such as an elliptical shape or a substantially crescent shape is widely used in a vertical cross section in the bead longitudinal direction. In the case illustrated in FIG. 3, the shape of the bead is approximated to the bead model BM0 having a substantially crescent cross-sectional shape cut along the upper surface (straight line) of the base plate 27 at a radial position P0 in the middle of the circle 41 from the center O toward the upper circumference. That is, the shape of the bead is represented by using the bead model BM0 represented by the radius r, the bead height h, the bead width W0, and the cross-sectional area S0.

In the bead model BM0, the cross-sectional shape does not necessarily coincide with the actual bead cross-sectional shape obtained by welding, and the difference in the cross-sectional shape is a factor that increases the design error. In addition, it is preferable that the deposition plan is a plan in which beads are continuously formed under a constant welding condition from the viewpoint of construction and quality. Therefore, it is desirable to make the cross-sectional shape of the bead (cross-sectional area S0) constant. However, when the cross-sectional area 51 of the bead model BM1 corresponding to another adjacent bead is obtained in the bead model BM0 having a substantially crescent shape in which the surface has a circular arc shape, the arithmetic operation of obtaining the cross-sectional area 51 is complicated since the arc portions of the bead model BM0 and the bead model BM1 overlap each other (since the pitch Pt<the bead width W0). Similarly, the arithmetic operation of the cross-sectional area S2 for the bead model BM2 adjacent to the bead model BM1 is complicated. This also applies to an elliptical bead model.

Therefore, in the present additive manufacturing method, the shape of the bead model is changed from a crescent shape or an elliptical shape in the related-art to a trapezoid and a parallelogram that are closer to the cross-sectional shape of the actual bead. In addition, by arranging the bead model with a trapezoidal cross-sectional shape (trapezoidal bead model) and a bead model with a parallelogram at the same height (parallelogram bead model) adjacent to each other, there is no overlapping portion described above, and the arithmetic operation of the cross-sectional area of the bead model can be simplified.

The additive manufacturing method basically has the following steps.

(1) a step of reading three-dimensional shape data of the additively-manufactured object.
(2) a step of determining a deposition direction of the bead depending on a three-dimensional model shape of the three-dimensional shape data.
(3) a step of dividing a three-dimensional model shape into a plurality of layers along the deposition direction.
(4) a step of dividing each of the divided layers into a bead model of a plurality of lines depending on a bead shape in the formation order of the bead.
(5) a step of preparing an additively-manufactured object by repeating a process of forming a bead along a bead model from a lower layer to an upper layer of a plurality of divided layers.

The above steps (1) to (3) are performed by the controller 15 (FIG. 1) as described above, and the step (5) is performed by driving the welding robot 19 according to the drive program. Hereinafter, the step (4) will be described in detail.

Figure 4:
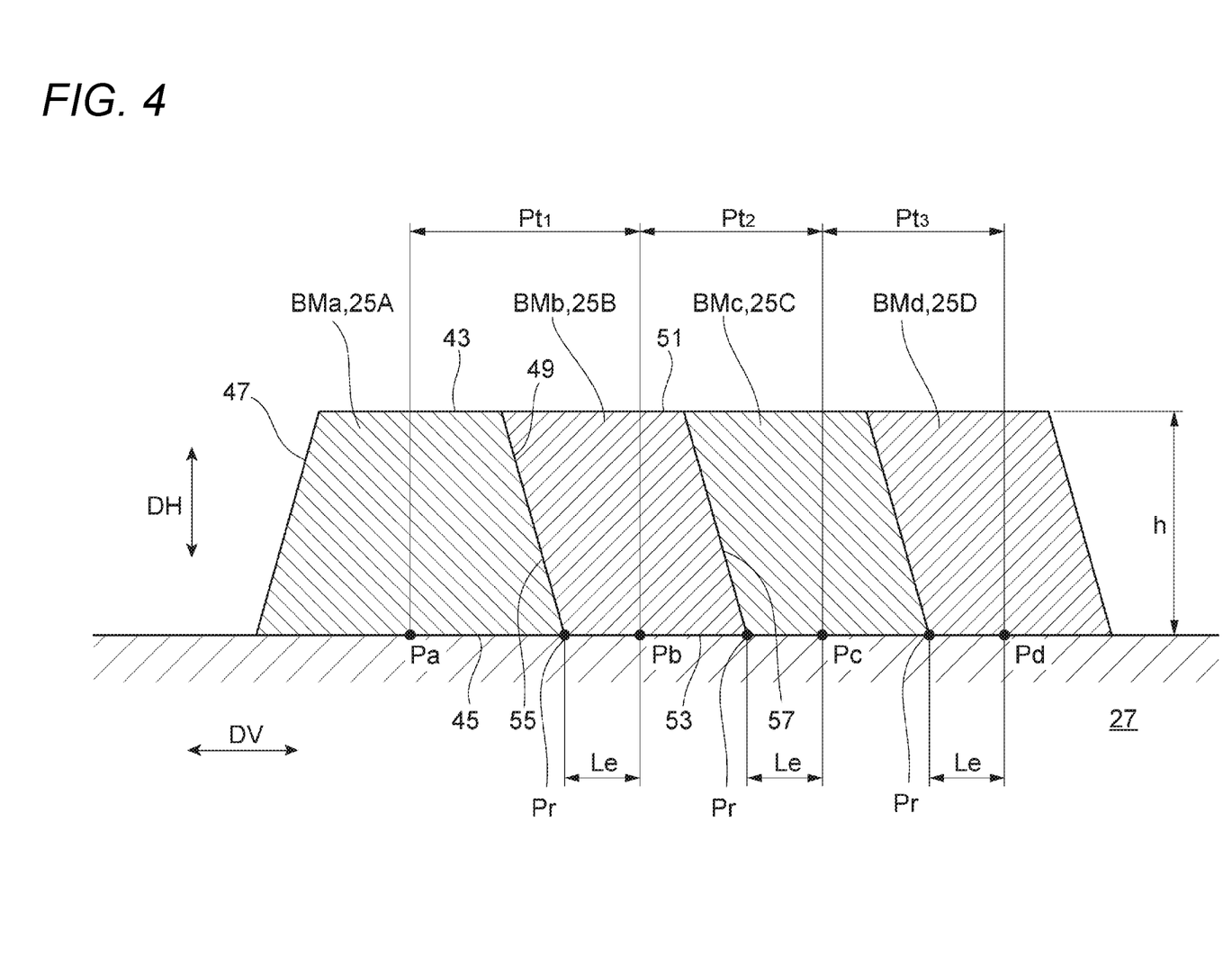
FIG. 4 is a cross-sectional view illustrating a bead of an initial layer formed on the base plate illustrated in FIG. 2 and a bead model applied to each bead.

FIG. 4 is a cross-sectional view showing beads 25A, 25B, 25C, and 25D of an initial layer formed on the base plate 27 illustrated in FIG. 2 and a bead model applied to each bead. Here, although four beads are illustrated for the sake of simplicity, the number of beads, the bead height h, and the like are arbitrarily set depending on the shape of the additively-manufactured object, the welding condition, and the like.

The beads 25A, 25B, 25C, and 25D illustrated in FIG. 4 are formed in this order. The cross-sectional shape of each of the actual beads 25A, 25B, 25C, and 25D is not necessarily a trapezoidal shape or a parallelogram shape, but at least has a shape that is closer to a trapezoidal shape or a parallelogram shape than a crescent shape or an ellipse, and a high fitting property with the bead model may be obtained.

The trapezoidal shape as used herein refers to a shape in which an upper base 43 and a lower base 45, which are opposite sides in a bead deposition direction DH, are parallel to each other, and lateral sides 47 and 49, which are opposite sides in a bead arrangement direction DV, are non-parallel to each other. In addition, referring to the parallelogram bead model BMb, the parallelogram is a shape in which an upper side 51 and a lower side 53, which are opposite sides in the bead deposition direction DH, are parallel to each other, and lateral sides 55 and 57, which are opposite sides in the bead arrangement direction DV, are parallel to the lateral side 49 of another bead model (trapezoidal bead model BMa) adjacent to the parallelogram. It is assumed that the height h of the trapezoid is equal to the height h of the parallelogram.

The bead 25A illustrated in FIG. 4 is a bead formed first, and the cross-sectional shape thereof tends to be wider on the lower side (base plate 21 side) than on the upper side. Therefore, the trapezoidal bead model BMa is applied to the bead 25A.

The bead 25B formed adjacent to the bead 25A is joined to one side surface of the bead 25A by melting a part thereof, and is formed along the bead 25A. In the cross-sectional shape, one lateral side 55 of the bead 25B is joined to the lateral side 49 of the bead 25A adjacent thereto, and accordingly, the other lateral side 57 is substantially parallel to the one lateral side 55. Therefore, the parallelogram bead model BMb is applied to the bead 25B. Similarly, parallelogram bead models BMc and BMd are respectively applied to a bead 25C formed adjacent to the bead 25B and a bead 25D formed adjacent to the bead 25C.

In this way, the trapezoidal bead model is applied to the bead on the first pass in the movement trajectory of the torch, and the parallelogram bead model is applied to the beads on the second and subsequent passes. The shape of each bead model is determined so as to match the width and height of the layer to be formed. Further, in order to deposit each bead in the layer at a common height h, it is preferable to finely adjust the target formation positions Pb, Pc, and Pd of the respective beads.

Specifically, the distance from an end Pr of a boundary between the bottom side (the lower base 45) of the trapezoidal bead model BMa and the parallelogram bead model BMb adjacent to the trapezoidal bead model BMa to the target formation position Pb of the bead corresponding to the adjacent parallelogram bead model BMb is defined as an adjustment distance Le. Similarly, for the parallelogram bead model BMc, the distance from the end Pr of the bottom side (lower side 53) of the adjacent parallelogram bead model BMb that forms the bead first on the parallelogram bead model BMc side to the target formation position Pc of the bead is defined as the adjustment distance Le. Similarly, for the parallelogram bead model BMd, the distance from the end Pr of the bottom side of the parallelogram bead model BMc on the parallelogram bead model BMc side to the target formation position Pd of the bead is defined as the adjustment distance Le.

The adjustment distance Le is adjusted such that the height h of each bead to be formed is constant. At this time, other welding conditions (welding current, welding voltage, shield gas flow rate, and the like) are regarded as constant. Each adjustment distance Le may be constant or may be set to a different distance. By this adjustment work, pitches $Pt_1$, $Pt_2$, and $Pt_3$ between the target formation positions of the respective beads are obtained.

Figure 5:
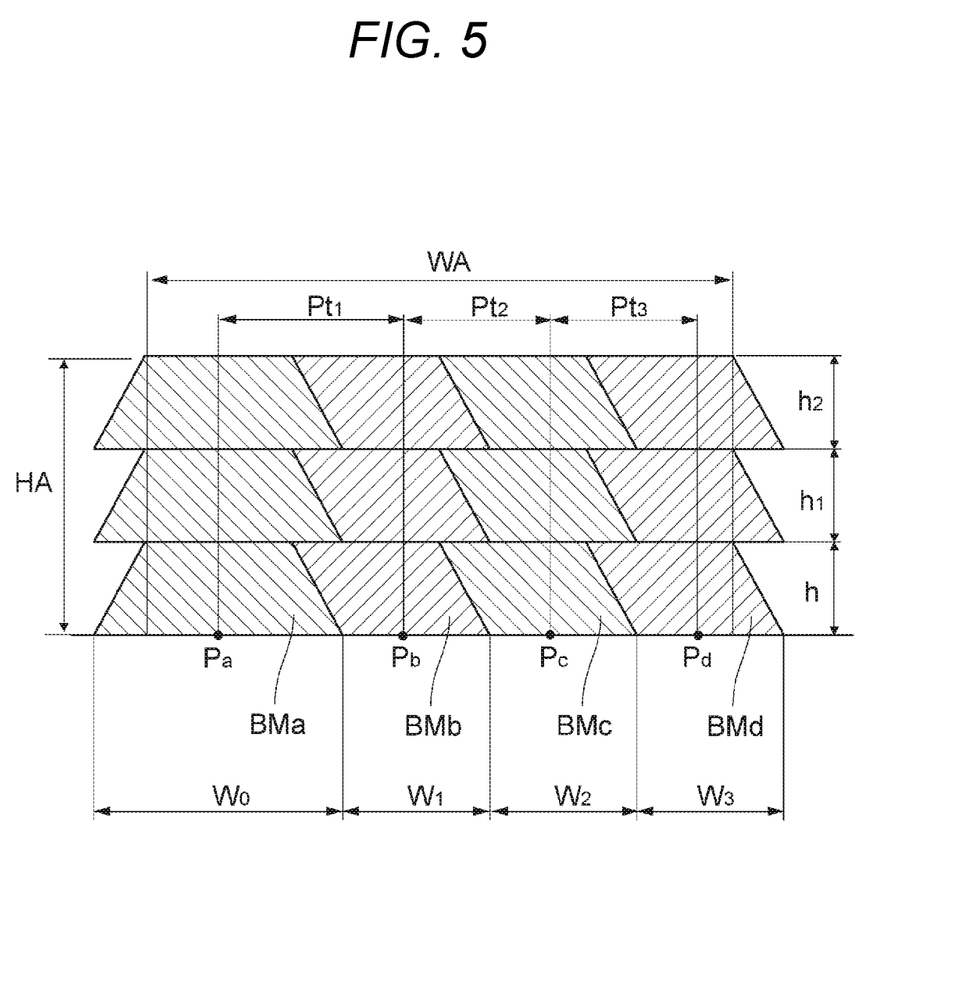
FIG. 5 is an explanatory view of a bead model in which a plurality of bead layers are deposited on a bead layer of an initial layer.

FIG. 5 is an explanatory view of a bead model in which a plurality of bead layers are deposited on a bead layer of the initial layer.

As illustrated in FIG. 5, parallelogram bead models BMb, BMc, and BMd are arranged adjacent to each other in this order starting from the trapezoidal bead model BMa at the position of the bead layer of the initial layer. Similarly, layers of the trapezoidal bead model BMa and the parallelogram bead models BMb, BMc, and BMd are arranged in a multistage manner on the model layer.

Each of the pitches $Pt_1$, $Pt_2$, and $Pt_3$ has a length finely adjusted by the adjustment distance Le illustrated in FIG. 4 such that the bead height h, h1, h2 of each layer is constant, and a bead width $W_0$, $W_1$, $W_2$, and $W_3$ corresponding thereto.

The bead model assembly formed of a plurality of bead models has a solid body width WA and a solid body height HA set to a size in which the size of the additively-manufactured object to be formed is included. As a result, when the beads are deposited along the bead model, an additively-manufactured object having a necessary and sufficient size (solid body width WA, solid body height HA) is obtained.

As described above, the three-dimensional model depending on the three-dimensional shape data is divided into a plurality of layers, and each of the divided layers is divided into the trapezoidal bead model and the parallelogram bead model, and each bead model is arranged depending on the formation order of the beads. Then, the additively-manufactured object is formed by repeating the process of forming the bead along the arranged bead model from the lower layer to the upper layer of the plurality of divided layers.

The procedure of the process of forming the bead along the arranged bead model is performed by the execution of the above-described drive program. As a result, a desired additively-manufactured object can be accurately and efficiently formed.

In addition, various feature points such as an end portion, a top portion, a bottom side, an upper side, and an oblique side of the model, and various parameters such as a pitch, a bead height, a bead width, a solid body width, and a solid body height can be finely adjusted by displaying a bead model as illustrated in FIG. 5 on a display unit. For example, by operating a mouse, a keyboard, or the like of the input unit 40, it is possible to easily perform fine adjustment of the position and the shape of the model by moving the feature point on the screen of the display unit 39, or by inputting a parameter value or the like. In this case, for example, the knowledge obtained by the experience of the operator can be easily propagated to the mechanically generated model, and additive manufacturing with higher quality and higher productivity can be performed.

According to this additive manufacturing method, since the cross-sectional shape of each bead model is a simple shape in which the curved portion does not exist, the extraction of the bead boundary, the evaluation of the bead height and the bead width can be easily performed. Therefore, the number of passes and layers for bead formation can be easily and accurately estimated from the shape information of the additively-manufactured object such as CAD data, and the deposition plan is not complicated. In addition, since the re-planning can be simply performed even when various conditions such as the position of the end portion of the additively-manufactured object, the repeated welding condition, the pitch of the target formation position of the bead, and the like are changed, the design change can be easily performed.

Further, in actual building, a step of setting welding conditions capable of realizing the above-described deposition plan is also required. For this purpose, information of a building result by combining conditions of a trapezoidal bead model and a parallelogram bead model having a predetermined width and height and welding conditions are stored in a database, and the correspondence relationship between the model condition and the welding condition can be easily referred to. Thus, a welding condition suitable for the bead model can be determined using the database, and a more appropriate bead can be formed.

Further, in the case where an excess thickness portion is provided at the outer edge of the three-dimensional model depending on the three-dimensional shape data, the bead width of the bead model of the portion corresponding to the outer edge and the excess thickness portion of the three-dimensional model may be changed depending on the excess thickness amount of the excess thickness portion (the excess thickness in the cross section orthogonal to the bead longitudinal direction). In the additive manufacturing method, even when the excess thickness portion is provided in the three-dimensional model, it is possible to change the outer shape without repeating a complicated arithmetic operation simply by changing the bead model adjacent to the position of the excess thickness portion, that is, the width (bead width) of the bead model of the end portion.

<Second Additive Manufacturing Method>

Next, a second additive manufacturing method will be described.

The trapezoidal bead model and the parallelogram bead model described in the first additive manufacturing method are models that can easily predict the shape after building. However, when it is desired to search for the building conditions more accurately, the overlap amount with the adjacent bead may be evaluated, and the bead model obtained by the first additive manufacturing method may be corrected. In the additive manufacturing method, a bead model (partially circular bead model) having a substantially crescent shape is used, and the overlap amount with the adjacent bead is taken into account to realize a bead model that can be deposited and designed with high accuracy.

Figure 6:
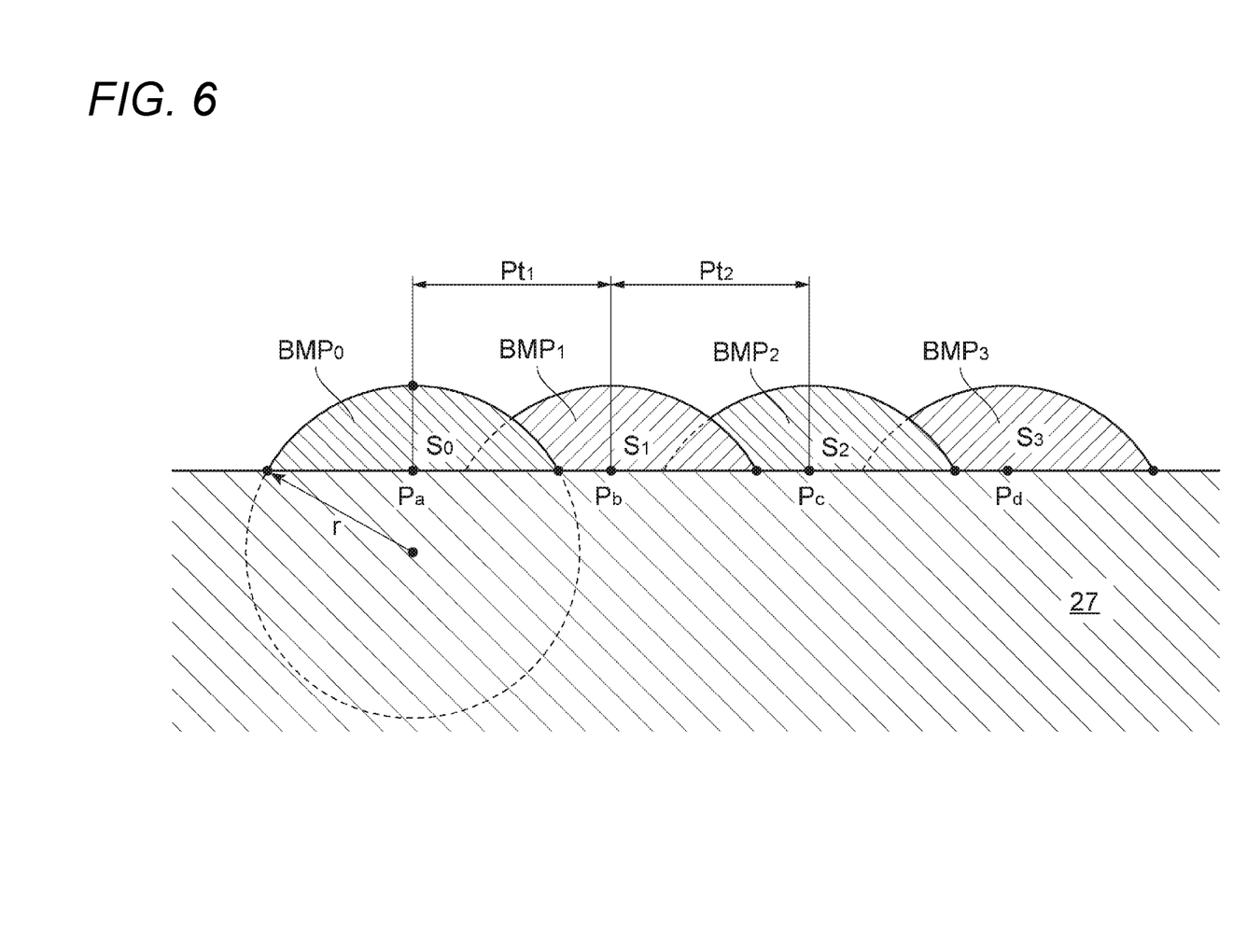
FIG. 6 is a schematic explanatory view of a partial circular model.
Figure 7:
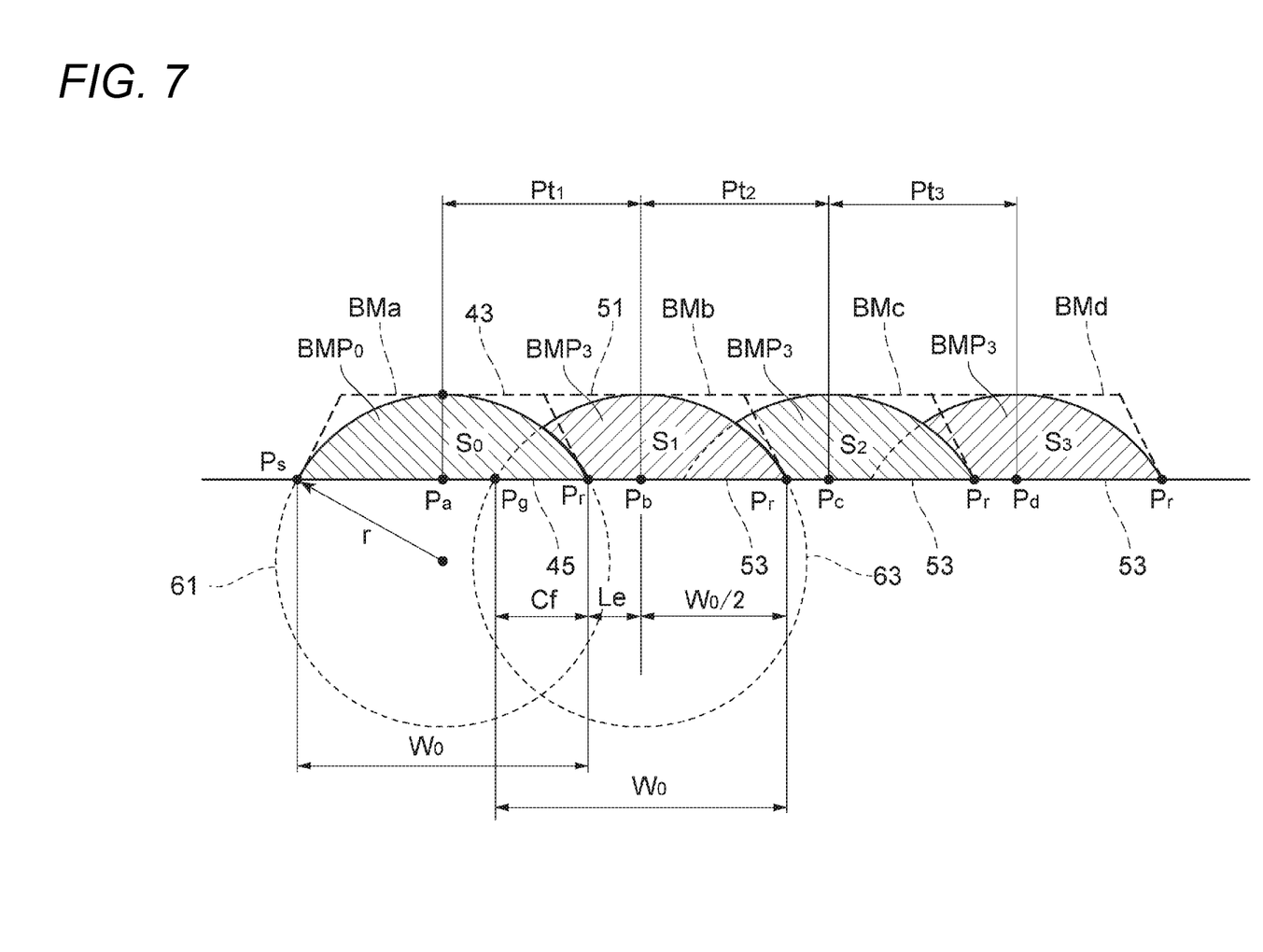
FIG. 7 is a detailed explanatory view geometrically illustrating the model illustrated in FIG. 6.

FIG. 6 is a schematic explanatory view of a partial circular model, and FIG. 7 is a detailed explanatory view geometrically illustrating the model illustrated in FIG. 6.

In this additive manufacturing method, as illustrated in FIG. 6, when beads are arranged side by side in one direction, partial circular bead models $BMP_0$, $BMP_1$, $BMP_2$, and $BMP_3$ having a circumference (arc) with a radius r are used. In this case, an overlapping portion is formed between the arcs of the adjacent bead models. The overlap of the bead is represented by the overlap amount (cross feed length) Cf as illustrated in FIG. 7.

As an example, the overlap amount Cf can be expressed by a relational expression between the above-described bead width $W_0$ and the adjustment distance Le, as represented by the following formula (1).

$$Cf=(\tfrac{1}{2})W_0-Le \qquad (1)$$

The overlap amount Cf is set to an appropriate value at which welding defects obtained in advance are less likely to occur. That is, the adjustment distance Le determined using the above-described trapezoidal bead model and parallelogram bead model is corrected depending on the set overlap amount Cf of the partial circular bead model. Accordingly, the pitches $Pt_1$, $Pt_2$, and $Pt_3$ (see FIG. 4) of the respective beads can be set more appropriately.

Specifically, the fitting of the partial circular bead model $BMP_0$ to the trapezoidal bead model BMa is performed by selecting a radius r at which the circumference of the partial circular bead model $BMP_0$ has a common difference with both ends of the lower base 45 of the trapezoidal bead model BMa and is tangent to the upper base 43 of the trapezoidal bead model. Instead of the circumference of the partial circular bead model $BMP_0$ tangent to the upper base 43 of the trapezoidal bead model, the radius r may be selected such that the area of the partial circular bead model $BMP_0$ is a desired cross-sectional area $S_0$.

Here, a virtual reference circle 61 having a radius r that passes through both end portions Ps and Pr of the lower base 45 of the trapezoidal bead model BMa and is tangent to the upper base 43 is defined. Further, a virtual circle 63 passing through the end portion Pr of the lower side 53 of the parallelogram bead model BMb adjacent to the trapezoidal bead model BMa on the side opposite to the trapezoidal bead model BMa side and being tangent to the upper side 51 is defined so as to overlap at least a part of the virtual reference circle 61. When the virtual circle 63 is obtained, the adjustment distance Le is corrected such that the overlap amount Cf is the value obtained in advance. In addition, the virtual circle is obtained by determining the radius r at which the cross-sectional area $S_1$ may be determined to be equal to the cross-sectional area $S_0$ of the trapezoidal bead model BMa.

The pitch $Pt_1$ between the target formation positions Pa and Pb of the beads is changed depending on the position of the virtual circle 63 determined in this way. Similarly, for the parallelogram bead models BMc and BMd, the adjustment distance Le is corrected such that the overlap amount Cf of the bead model is the above-described set value or the cross-sectional areas $S_2$ and $S_3$ are equal to each other, and the pitches $Pt_2$ and $Pt_3$ of the target formation positions Pc and Pd of the beads are changed.

When the overlap amount Cf of the bead model is constant in each of the partial circular bead models $BMP_0$, $BMP_1$, $BMP_2$, and $BMP_3$, the pitches $Pt_1$, $Pt_2$, and $Pt_3$ are equal to each other.

According to this method, after the deposition plan is performed using the trapezoidal bead model and the parallelogram bead model and the approximate position of the bead formation is determined, the target formation position of the bead is corrected using the partial circular model such that the overlap amount Cf of each partial circular model is a desired value. Accordingly, it is possible to determine a more accurate bead formation position in consideration of the overlapping portion of the beads, and it is possible to further improve the accuracy of the deposition plan. In addition, as compared with the case where the trajectory plan of the additive manufacturing is performed only by the partial circular bead model from the beginning, the deposition plan considering the overlapping portion of the beads can be performed without complicating the arithmetic operation processing, and the shape deviation between the bead model and the actual bead can be reduced.

This method can also be used to verify the validity of the adjustment distance Le set by the trapezoidal bead model and the parallelogram bead model in the first additive manufacturing method.

<Third Additive Manufacturing Method>

In the above-described additive manufacturing method, a form is shown in which the parallelogram bead model is repeatedly arranged along one direction adjacent to the trapezoidal bead model with the trapezoidal bead model as a start point, but the present invention is not limited thereto.

Figure 8:
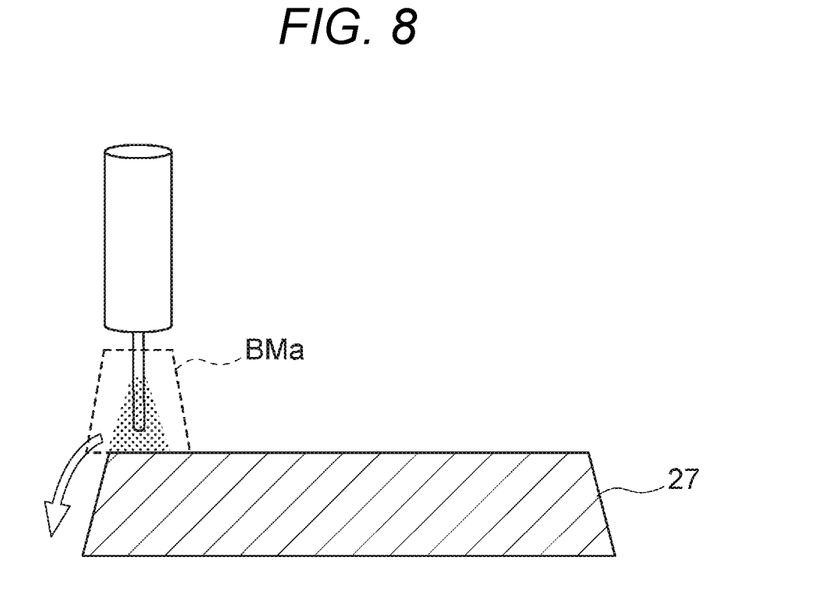
FIG. 8 is an explanatory view of a case where a bead is formed with one end portion of a base plate as a start point.

For example, as illustrated in FIG. 8, when a bead is formed with one end portion of the base plate 27 as a starting point, in a bead (trapezoidal bead model BMa) formed first, a weld metal such as a melted filler metal may drop down from an end portion of the base plate 27.

Figure 9:
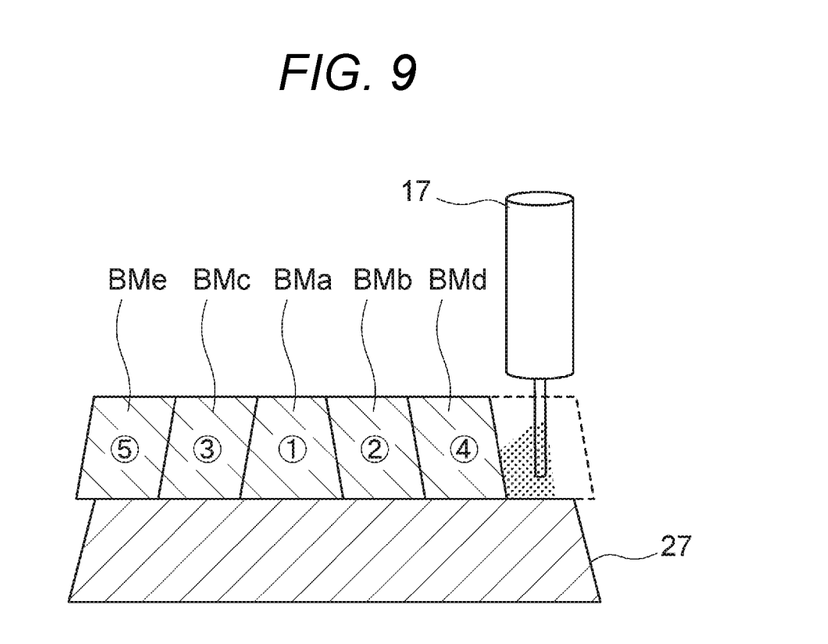
FIG. 9 is an explanatory view in a case where beads are alternately formed on both sides of a bead around a bead on an inner side of an end portion of the base plate.

In such a case, it is preferable to change the bead formation order. For example, as illustrated in FIG. 9, a start point of bead formation is provided inside the end portion of the base plate 27. Then, the beads (parallelogram bead models BMb, BMc, BMd, BMe) are alternately formed on both sides of the starting bead (trapezoidal bead model BMa) around the starting bead.

Further, in the case illustrated in FIG. 9, the end portion of the bead row indicated by the dotted line is disposed at the end portion of the base plate 27, at the time of bead formation, the arc generated from the torch 17 approaches the existing bead side. Therefore, even when a bead is formed on the end portion of the base plate 27, it can be inferred that dripping of the weld metal is suppressed.

The present invention is not limited to the above embodiments, and combinations of the respective configurations of the embodiments, or changes and applications made by those skilled in the art based on the description of the specification and the well-known technology are also intended by the present invention and are included within the scope to be protected.

As described above, the present description discloses the following matters.

(1) An additive manufacturing method for preparing a built-up object by depositing a bead formed by melting and solidifying a filler metal on a base, the method including:
a step of reading three-dimensional shape data of the built-up object;
a step of determining a deposition direction of the bead depending on a three-dimensional model shape of the three-dimensional shape data;
a step of dividing the three-dimensional model shape into a plurality of layers along the deposition direction;
a step of dividing each layer, that is divided, into a bead model of a plurality of lines depending on a bead shape in a formation order of the bead; and
a step of preparing the built-up object by repeating a process of forming the bead along the bead model from a lower layer to an upper layer of the plurality of layers, wherein,
in the step of dividing into the bead model of the plurality of lines,
to a position where the bead is formed in a portion not adjacent to an existing bead in the layer, a trapezoidal bead model a vertical cross section of which in a bead longitudinal direction is a trapezoidal shape is applied, in the trapezoidal bead model opposite sides in the deposition direction of the bead being parallel to each other, and opposite sides in a bead arrangement direction in the layer being non-parallel to each other, and,
to a position where the bead is formed adjacent to a bead that is already formed, a parallelogram bead model a vertical cross section of which in the bead longitudinal direction is a parallelogram is applied, in the parallelogram bead model opposite sides in the deposition direction of the bead being parallel to each other, and opposite sides in the bead arrangement direction being parallel to a side of another bead mode that is adjacent.

According to this additive manufacturing method, the number of passes and layers for bead formation can be easily and accurately estimated from the shape of the additively-manufactured object, and the deposition plan is not complicated. In addition, since the re-planning can be simply performed even when various conditions such as the position of the end portion of the additively-manufactured object, the repeated welding condition, the pitch of the target formation position of the bead, and the like are changed, the design change can be easily performed.

(2) The additive manufacturing method according to (1), including a step of changing a welding condition of the bead according to a height and a width of the bead model in the vertical cross section by referring to a database in which building results obtained based on a combination of a plurality of types of welding conditions, bead heights, and bead widths are stored.

According to this additive manufacturing method, a more appropriate bead can be formed by determining the welding condition depending on the bead model with reference to the database.

(3) The additive manufacturing method according to (1) or (2), including:
a step of adding an excess thickness portion to an outer edge of the three-dimensional model shape, and
a step of changing a width of an adjacent bead model that is adjacent to a position of the added excess thickness portion depending on a width of the excess thickness portion in the vertical cross section with respect to the adjacent bead model.

According to this additive manufacturing method, even when the excess thickness portion is provided, it is possible to easily change the outer shape only by changing the bead model of the end portion corresponding to the excess thickness portion.

(4) The additive manufacturing method according to (1) or (2), wherein an adjustment distance from a boundary position between bases of a pair of bead models arranged adjacent to each other in a same layer to a bead target formation position of a bead model, in the pair of bead models, with a later bead formation order is determined such that a height of the bead in the layer is constant.

According to this additive manufacturing method, the height of each bead in the layer can be made uniform by appropriately adjusting the adjustment distance.

(5) The additive manufacturing method according to (4), including a step of applying a partial circular bead model having an arc at least in a part of the vertical cross section to the trapezoidal bead model and the parallelogram bead model respectively, wherein in the step, the adjustment distance is corrected such that overlapping of the arcs of the partial circular bead models adjacent to each other has a predetermined overlap amount.

According to this additive manufacturing method, the bead model can be determined in consideration of the overlap amount between the beads, and a more accurate deposition plan can be realized.

(6) A manufacturing apparatus for manufacturing an additively-manufactured object, to prepare a built-up object by depositing a bead formed by melting and solidifying a filler metal on a base by a torch, the manufacturing apparatus comprising:

a controller configured to read three-dimensional shape data of the built-up object, determine a deposition direction of the bead depending on a three-dimensional model shape of the three-dimensional shape data, divide the three-dimensional model shape into a plurality of layers along the deposition direction, divide each layer, that is divided, into a bead model of a plurality of lines depending on a bead shape in a formation order of the bead, and determine a trajectory plan of the torch; and an additive manufacturing apparatus configured to prepare the built-up object by repeating a process of forming the bead along the bead model from a lower layer to an upper layer of the plurality of layers, wherein, in a case of dividing into the bead model of the plurality of lines, the controller applies, to a position where the bead is formed in a portion not adjacent to an existing bead in the layer, a trapezoidal bead model a vertical cross section of which in a bead longitudinal direction is a trapezoidal shape, in the trapezoidal bead model opposite sides in the deposition direction of the bead being parallel to each other, and opposite sides in a bead arrangement direction in the layer being non-parallel to each other, and applies, to a position where the bead is formed adjacent to a bead that is already formed, a parallelogram bead model a vertical cross section of which in the bead longitudinal direction is a parallelogram, in the parallelogram bead model opposite sides in the deposition direction of the bead being parallel to each other, and opposite sides in the bead arrangement direction being parallel to a side of another bead mode that is adjacent.

According to this apparatus for manufacturing the additively-manufactured object, the number of passes and layers for bead formation can be easily and accurately estimated from the shape of the additively-manufactured object, and the deposition plan is not complicated. In addition, since the re-planning can be simply performed even when various conditions such as the position of the end portion of the additively-manufactured object, the repeated welding condition, the pitch of the target formation position of the bead, and the like are changed, the design change can be easily performed.

(7) A controller configured to read three-dimensional shape data of a built-up object formed by depositing a bead formed by melting and solidifying a filler metal on a base by a torch, determine a deposition direction of the bead depending on a three-dimensional model shape of the three-dimensional shape data, divide the three-dimensional model shape into a plurality of layers along the deposition direction, divide the divided layers into a bead model of a plurality of lines depending on the bead shape in the formation order of the bead, and determine a trajectory plan of the torch, wherein in a case of dividing into the bead model of the plurality of lines, the controller applies, to a position where the bead is formed in a portion not adjacent to an existing bead in the layer, a trapezoidal bead model a vertical cross section of which in a bead longitudinal direction is a trapezoidal shape, in the trapezoidal bead model opposite sides in the deposition direction of the bead being parallel to each other, and opposite sides in a bead arrangement direction in the layer being non-parallel to each other, and applies, to a position where the bead is formed adjacent to a bead that is already formed, a parallelogram bead model a vertical cross section of which in the bead longitudinal direction is a parallelogram, in the parallelogram bead model opposite sides in the deposition direction of the bead being parallel to each other, and opposite sides in the bead arrangement direction being parallel to a side of another bead mode that is adjacent.

According to this controller, by using the trapezoidal bead model and the parallelogram bead model, the deposition plan can be determined without requiring complicated arithmetic operation.

(8) The controller according to (7), further including a display unit configured to display information of the trajectory plan.

According to this controller, by displaying the deposition plan on the display unit, the deposition plan can be visually understood by the operator, and the operator can support the generation and the determination work of the deposition plan.

(9) The controller according to (8), further including an input unit configured to receive input information for changing information of the trajectory plan.

According to this controller, the trajectory plan can be arbitrarily changed according to the input information received by the input unit.

(10) The controller according to (9), wherein
information of the trajectory plan includes a feature point representing a shape of at least one of the trapezoidal bead model and the parallelogram bead model, and the controller changes shapes of the trapezoidal bead model and the parallelogram bead model depending on the input information received by the input unit.

According to this controller, it is possible to freely change the shapes of various bead models, and it is possible to perform additive manufacturing with higher quality and higher productivity.

The present application is based on a Japanese Patent Application (Japanese Patent Application No. 2019-118745) filed on Jun. 26, 2019, and the contents thereof are incorporated herein by reference.

REFERENCE SIGNS LIST

11 Additive manufacturing apparatus
15 Controller
17 Torch
19 Welding robot
23 Filler metal feeding unit
25, 25A, 25B, 25C, 25D Bead
27 Base plate
29 Bead layer
31 CAD/CAM Unit
33 Trajectory computing unit
35 Storage unit
37 Control unit
39 Display unit
40 Input unit
43 Upper base
45 Lower base (bottom side)
47, 49 Lateral side
51 Upper side
53 Lower side
55, 57 Lateral side
61 Virtual reference circle
63 Virtual circle
100 Manufacturing apparatus of additively-manufactured object
BMa Trapezoid bead model
BMb, BMc, BMd, BMe Parallelogram bead model
$BMP_0$, $BMP_1$, $BMP_2$, $BMP_3$ Partial circular bead model
Cf Overlap amount
DH Bead deposition direction
DV Bead arrangement direction
h Bead height
Le Adjustment distance
Pa, Pb, Pc, Pd Target formation position
Pt, $Pt_1$, $Pt_2$, $Pt_3$ Pitch
W Additively-manufactured object
$W_0$, $W_1$, $W_2$, $W_3$ Bead width

The invention claimed is:

1. An additive manufacturing method for preparing a built-up object by depositing a bead formed by melting and solidifying a filler metal on a base, the method comprising:
a step of reading three-dimensional shape data of the built-up object;
a step of determining a deposition direction of the bead depending on a three-dimensional model shape of the three-dimensional shape data;
a step of dividing the three-dimensional model shape into a plurality of layers along the deposition direction;
a step of dividing each layer of the plurality of layers into a plurality of bead models depending on a bead shape in a formation order of the bead,
wherein the step of dividing each layer of the plurality of layers into the plurality of bead models includes:
applying a trapezoidal bead model of the plurality of bead models to a position where the bead is formed in a portion of a divided layer of the plurality of layers, wherein the portion of the divided layer is not adjacent to any existing bead models in the divided layer, the trapezoidal bead model has a trapezoidal shape in a vertical cross section across a bead longitudinal direction, opposite sides of the trapezoidal bead model in the deposition direction of the bead are parallel to each other, and opposite sides of the trapezoidal bead model in a bead arrangement direction in the divided layer are non-parallel to each other, and
applying a parallelogram bead model of the plurality of bead models to a position where the bead is formed adjacent to a previously formed bead model of the plurality of bead models in the divided layer, wherein the parallelogram bead model has a parallelogram shape in a vertical cross section across the bead longitudinal direction, opposite sides of the parallelogram bead model in the deposition direction of the bead are parallel to each other, and opposite sides of the parallelogram bead model in the bead arrangement direction are parallel to a side of the previously formed bead model; and
a step of additively manufacturing the built-up object by repeating a process of forming the bead according to the plurality of bead models including the trapezoidal bead model and the parallelogram bead model from a lower layer to an upper layer of the plurality of layers.

2. The additive manufacturing method according to claim 1, comprising
a step of changing a welding condition of the bead according to a height and a width of one or more of the trapezoidal bead model in the vertical cross section and the parallelogram bead model in the vertical cross section by referring to a database in which building results obtained based on a combination of a plurality of types of welding conditions, bead heights, and bead widths are stored.

3. The additive manufacturing method according to claim 2, comprising
a step of adding an excess thickness portion to an outer edge of the three-dimensional model shape, and
a step of changing a width of an adjacent bead model that is adjacent to a position of the added excess thickness portion depending on a width of the excess thickness portion in the vertical cross section with respect to the adjacent bead model.

4. The additive manufacturing method according to claim 2, wherein
an adjustment distance from a boundary position between bases of a pair of bead models of the plurality of bead models arranged adjacent to each other in the divided layer to a bead target formation position of a later formed bead model of the pair of bead models is determined such that a height of the bead in the divided layer is constant.

5. The additive manufacturing method according to claim 4, comprising:
a step of applying a partial circular bead model having an arc at least in a part of the vertical cross section to the trapezoidal bead model and the parallelogram bead model respectively,
wherein in the step, the adjustment distance is corrected such that overlapping adjacent arcs of the partial circular bead models have a predetermined overlap amount.

6. The additive manufacturing method according to claim 1, comprising a step of adding an excess thickness portion to an outer edge of the three-dimensional model shape, and a step of changing a width of an adjacent bead model that is adjacent to a position of the added excess thickness portion depending on a width of the excess thickness portion in the vertical cross section with respect to the adjacent bead model.

7. The additive manufacturing method according to claim 1, wherein an adjustment distance from a boundary position between bases of a pair of bead models of the plurality of bead models arranged adjacent to each other in the divided layer to a bead target formation position of a later formed bead model of the pair of bead models is determined such that a height of the bead in the divided layer is constant.

8. The additive manufacturing method according to claim 7, comprising:

a step of applying a partial circular bead model having an arc at least in a part of the vertical cross section to the trapezoidal bead model and the parallelogram bead model respectively, wherein in the step, the adjustment distance is corrected such that overlapping adjacent arcs of the partial circular bead models have a predetermined overlap amount.

9. A manufacturing apparatus for manufacturing an additively-manufactured built-up object by depositing a bead formed by melting and solidifying a filler metal on a base by a torch, the manufacturing apparatus comprising:

a controller configured to read three-dimensional shape data of the built-up object, determine a deposition direction of the bead depending on a three-dimensional model shape of the three-dimensional shape data, divide the three-dimensional model shape into a plurality of layers along the deposition direction, divide each layer of the plurality of layers into a plurality of bead models depending on a bead shape in a formation order of the bead, and determine a trajectory plan of the torch, wherein upon dividing each layer of the plurality of layers into the plurality of bead models, the controller is configured to:

apply a trapezoidal bead model of the plurality of bead models to a position where the bead is formed in a portion of a divided layer of the plurality of layers, wherein the portion of the divided layer is not adjacent to any existing bead models in the divided layer, the trapezoidal bead model has a trapezoidal shape in a vertical cross section across a bead longitudinal direction opposite sides of the trapezoidal bead model in the deposition direction of the bead are parallel to each other, and opposite sides of the trapezoidal bead model in a bead arrangement direction in the divided layer are non-parallel to each other, and apply a parallelogram bead model of the plurality of bead models to a position where the bead is formed adjacent to a previously formed bead model in the divided layer, wherein the parallelogram bead model has a parallelogram shape in a vertical cross section across the bead longitudinal direction, opposite sides of the parallelogram bead model in the deposition direction of the bead are parallel to each other, and opposite sides of the parallelogram bead model in the bead arrangement direction are parallel to a side of the previously formed bead model; and an additive manufacturing device configured to prepare the built-up object by repeating a process of forming the bead according to the plurality of bead models including the trapezoidal bead model and the parallelogram bead model from a lower layer to an upper layer of the plurality of layers.

10. A controller configured to read three-dimensional shape data of a built-up object formed by depositing a bead formed by melting and solidifying a filler metal on a base by a torch, determine a deposition direction of the bead depending on a three-dimensional model shape of the three-dimensional shape data, divide the three-dimensional model shape into a plurality of layers along the deposition direction, divide the plurality of layers into a plurality of bead models depending on the bead shape in the formation order of the bead, and determine a trajectory plan of the torch, wherein upon-dividing the divided layers into the plurality of bead models, the controller is configured to:

apply a trapezoidal bead model of the plurality of bead models to a position where the bead is formed in a portion of a divided layer of the plurality of layers, wherein the portion of the divided layer is not adjacent to any existing bead models in the divided layer, the trapezoidal bead model has a trapezoidal shape in a vertical cross section across a bead longitudinal direction, opposite sides of the trapezoidal bead model in the deposition direction of the bead are parallel to each other, and opposite sides of the trapezoidal bead model in a bead arrangement direction in the divided layer are non-parallel to each other, apply a parallelogram bead model of the plurality of bead models to a position where the bead is formed adjacent to a previously formed bead model in the divided layer, wherein the parallelogram bead model has a parallelogram shape in a vertical cross section across the bead longitudinal direction, opposite sides of the parallelogram bead model in the deposition direction of the bead are parallel to each other, and opposite sides of the parallelogram bead model in the bead arrangement direction are parallel to a side of the previously formed bead model, and control the torch according to the trajectory plan and to form the bead according to the plurality of bead models including the trapezoidal bead model and the parallelogram bead model.

11. The controller according to claim 10, further comprising a display unit configured to display information of the trajectory plan.

12. The controller according to claim 11, further comprising an input unit configured to receive input information for changing the information of the trajectory plan.

13. The controller according to claim 12, wherein the information of the trajectory plan includes a feature point representing a shape of at least one of the trapezoidal bead model and the parallelogram bead model, and the controller changes shapes of the trapezoidal bead model and the parallelogram bead model depending on the input information received by the input unit.

* * * * *